(12) United States Patent
Futatsugi

(10) Patent No.: US 9,552,443 B2
(45) Date of Patent: Jan. 24, 2017

(54) INFORMATION PROCESSING APPARATUS AND SEARCH METHOD

(75) Inventor: Hajime Futatsugi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 906 days.

(21) Appl. No.: 12/553,825

(22) Filed: Sep. 3, 2009

(65) Prior Publication Data

US 2010/0076975 A1    Mar. 25, 2010

(30) Foreign Application Priority Data

Sep. 8, 2008  (JP) .................................. 2008-229968

(51) Int. Cl.
*G06F 17/30*        (2006.01)
(52) U.S. Cl.
CPC .............. *G06F 17/30991* (2013.01)
(58) Field of Classification Search
CPC ............... G06F 17/30235; G06F 17/30631; G06F 17/30705; G06F 17/3071
USPC .......................... 707/E17.014, 736
See application file for complete search history.

(56) References Cited

U.S. PATENT DOCUMENTS

| 6,732,088 | B1 * | 5/2004 | Glance | G06F 17/30864 |
| 8,954,430 | B1 * | 2/2015 | Gaw | G06F 17/30864 707/732 |
| 2002/0069194 | A1 * | 6/2002 | Robbins | 707/3 |
| 2004/0158559 | A1 * | 8/2004 | Poltorak | 707/3 |
| 2006/0095498 | A1 * | 5/2006 | Yamauchi | 709/201 |
| 2006/0101074 | A1 * | 5/2006 | Cancilla et al. | 707/104.1 |
| 2006/0206468 | A1 * | 9/2006 | Dettinger et al. | 707/3 |
| 2006/0224938 | A1 * | 10/2006 | Fikes | G06F 17/30876 715/234 |
| 2006/0248062 | A1 * | 11/2006 | Libes | G06F 17/30864 |
| 2007/0203887 | A1 * | 8/2007 | Dynin | 707/3 |
| 2007/0244723 | A1 * | 10/2007 | Nagaeda | 705/2 |

FOREIGN PATENT DOCUMENTS

| JP | 9-006791 A | 1/1997 |
| JP | 2000-331010 A | 11/2000 |
| JP | 2007-133532 A | 5/2007 |

* cited by examiner

*Primary Examiner* — Grace Park
(74) *Attorney, Agent, or Firm* — Canon U.S.A., Inc. IP Division

(57) ABSTRACT

An information processing apparatus includes a search execution unit configured to execute a search on the basis of a search condition, an item specification unit configured to specify particular data as an item from data included in a result of the search executed by the search execution unit on the basis of the search condition, an item storage unit configured to store the item specified by the item specification unit in a storage apparatus, a search result generation unit configured to generate a search result without data overlap on the basis of data included in a result of a search executed by the search execution unit on the basis of a new search condition and the item stored in the storage apparatus, and a search result display unit configured to display the search result generated by the search result generation unit.

17 Claims, 14 Drawing Sheets

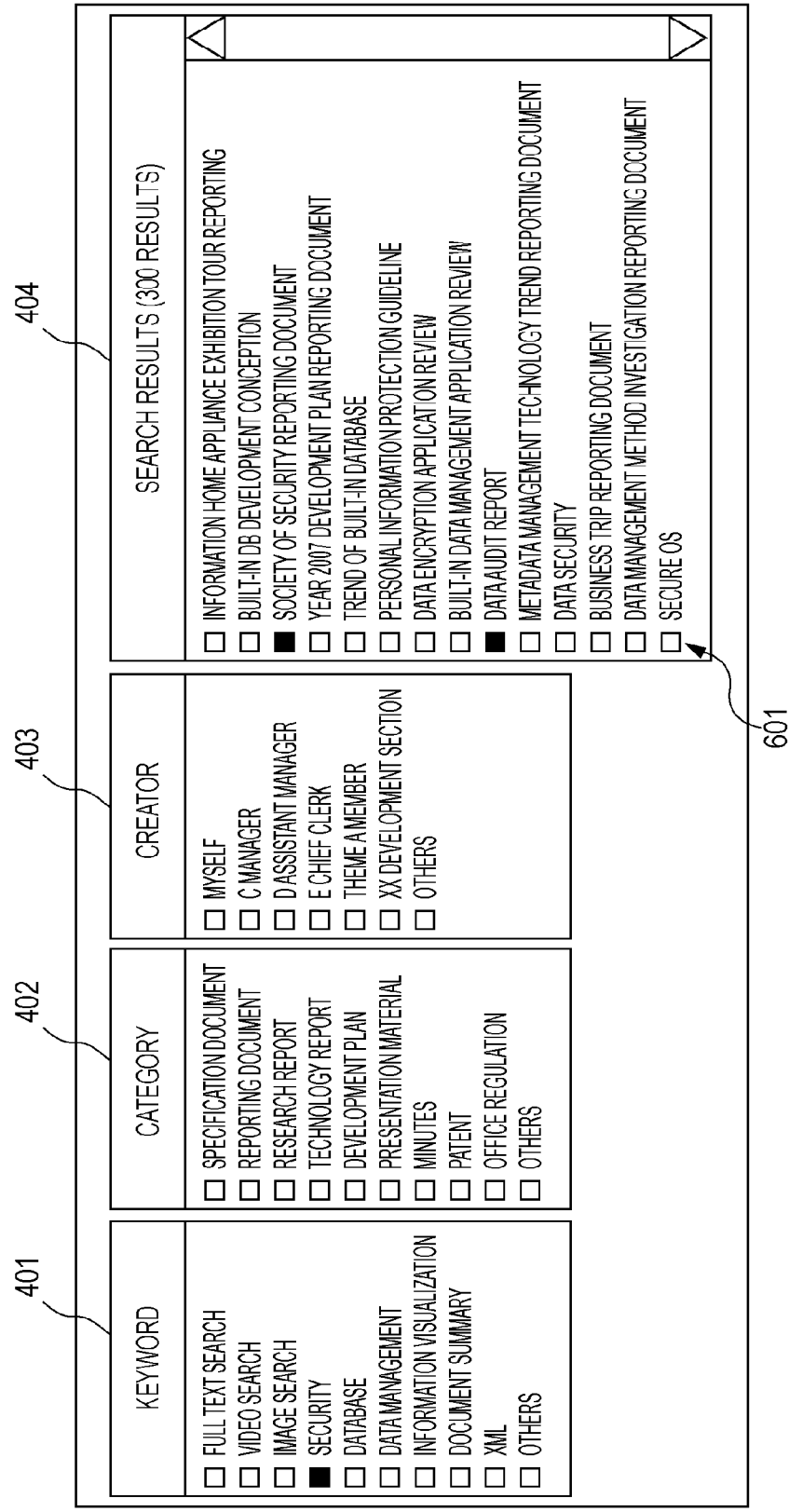

FIG. 8

| KEYWORD | CATEGORY | CREATOR | SEARCH RESULTS (100 RESULTS) |
|---|---|---|---|
| ☐ FULL TEXT SEARCH<br>☐ VIDEO SEARCH<br>☐ IMAGE SEARCH<br>■ SECURITY<br>☐ DATABASE<br>☐ DATA MANAGEMENT<br>☐ INFORMATION VISUALIZATION<br>☐ DOCUMENT SUMMARY<br>☐ XML<br>☐ OTHERS | ☐ SPECIFICATION DOCUMENT<br>■ REPORTING DOCUMENT<br>☐ RESEARCH REPORT<br>☐ TECHNOLOGY REPORT<br>☐ DEVELOPMENT PLAN<br>☐ PRESENTATION MATERIAL<br>☐ MINUTES<br>☐ PATENT<br>☐ OFFICE REGULATION<br>☐ OTHERS | ☐ MYSELF<br>☐ C MANAGER<br>☐ D ASSISTANT MANAGER<br>☐ E CHIEF CLERK<br>☐ THEME A MEMBER<br>☐ XX DEVELOPMENT SECTION<br>☐ OTHERS | ■ SOCIETY OF SECURITY REPORTING DOCUMENT<br>■ DATA AUDIT REPORT<br>☐ INFORMATION HOME APPLIANCE EXHIBITION TOUR REPORTING<br>☐ YEAR 2007 DEVELOPMENT PLAN REPORTING DOCUMENT<br>☐ TREND OF BUILT-IN DATABASE<br>☐ METADATA MANAGEMENT TECHNOLOGY TREND REPORTING DOCUMENT<br>☐ DATA SECURITY<br>☐ BUSINESS TRIP REPORTING DOCUMENT<br>☐ DATA MANAGEMENT METHOD INVESTIGATION REPORTING DOCUMENT<br>☐ DISK DELETION SOFTWARE INVESTIGATION REPORT<br>☐ ANTI-VIRUS REPORTING DOCUMENT<br>☐ SAFETY MANAGEMENT OF PAPER DOCUMENT |

FIG. 14A

| | NAME | CREATOR | CREA... |
|---|---|---|---|
| | SEARCH RESULTS (100 RESULTS) | | |
| ■ | SOCIETY OF SECURITY REPORTING DOCUMENT | A CLERK | |
| ■ | DATA AUDIT REPORT | C MANAGER | |
| ■ | TREND OF BUILT-IN DATABASE | E CHIEF CLERK | |
| ☐ | INFORMATION HOME APPLIANCE EXHIBITION TOUR REPORTING | A CLERK | |
| ☐ | YEAR 2007 DEVELOPMENT PLAN REPORTING DOCUMENT | D CHIEF CLERK | |
| ☐ | METADATA MANAGEMENT TECHNOLOGY TREND REPORTING DOCUMENT | D CHIEF CLERK | |
| ☐ | DATA SECURITY | B MANAGER | |
| ☐ | BUSINESS TRIP REPORTING DOCUMENT | F GENERAL MANAGER | |
| ☐ | DATA MANAGEMENT METHOD INVESTIGATION REPORTING DOCUMENT | A CLERK | |
| ☐ | DISK DELETION SOFTWARE INVESTIGATION REPORT | A CLERK | |
| ☐ | ANTI-VIRUS REPORTING DOCUMENT | G ASSISTANT MANAGER | |
| ☐ | SAFETY MANAGEMENT OF PAPER DOCUMENT | F GENERAL MANAGER | |

FIG. 14B

| | NAME | CREATOR △ | CREA... |
|---|---|---|---|
| | SEARCH RESULTS (100 RESULTS) | | |
| ■ | SOCIETY OF SECURITY REPORTING DOCUMENT | A CLERK | |
| ☐ | INFORMATION HOME APPLIANCE EXHIBITION TOUR REPORTING | A CLERK | |
| ☐ | DATA MANAGEMENT METHOD INVESTIGATION REPORTING DOCUMENT | A CLERK | |
| ☐ | DISK DELETION SOFTWARE INVESTIGATION REPORT | A CLERK | |
| ■ | DATA SECURITY | B MANAGER | |
| ☐ | DATA AUDIT REPORT | C MANAGER | |
| ☐ | YEAR 2007 DEVELOPMENT PLAN REPORTING DOCUMENT | D CHIEF CLERK | |
| ☐ | METADATA MANAGEMENT TECHNOLOGY TREND REPORTING DOCUMENT | D CHIEF CLERK | |
| ■ | TREND OF BUILT-IN DATABASE | E CHIEF CLERK | |
| ☐ | BUSINESS TRIP REPORTING DOCUMENT | F GENERAL MANAGER | |
| ☐ | SAFETY MANAGEMENT OF PAPER DOCUMENT | F GENERAL MANAGER | |
| ☐ | ANTI-VIRUS REPORTING DOCUMENT | G ASSISTANT MANAGER | | ism
INFORMATION PROCESSING APPARATUS AND SEARCH METHOD

BACKGROUND OF THE INVENTION

Field of the Invention

The present invention relates to an information processing apparatus and a search method.

Description of the Related Art

The number of opportunities is increased for searching various devices as well as Web or PC for data.

At this time, in a case where a search is performed with a purpose of obtaining plural pieces of data, a user often confronts the following problems.

It is difficult to find an appropriate condition matching with all the target data.

No condition matching with all the target data exists.

Condition matching with all the target data is too loose as a search condition.

For that reason, while changing the search condition, the user repeatedly executes the search to obtain the target data stepwise. As a method of facilitating such an operation of obtaining plural pieces of data through multiple searches, for example, Japanese Patent Laid-Open No. 2007-133532 proposes a method of holding particular pieces of data selected from search results by the user in a list to manage the data. The technology proposed in Japanese Patent Laid-Open No. 2007-133532 is utilized for a basket or a cart in a shopping site or the like.

SUMMARY OF THE INVENTION

However, according to the technology proposed in Japanese Patent Laid-Open No. 2007-133532, the pieces of data selected by the user and held in the list are also included in the search results in an overlapping manner. For that reason, for example, in a case where a plurality of documents and the like are searched for, a problem occurs that the user has a difficulty of identifying already found documents (documents held in the list) and unfound documents in the search results.

The present invention has been made in view of the above-described problem, and the invention provides an information processing apparatus capable of creating and providing, in a case where search conditions are changed to execute a plurality of searches, search results in which an overlap of data already obtained in a previous search with data obtained in a new search is eliminated.

Thus, according to an aspect of the present invention, there is provided an information processing apparatus including: a search execution unit configured to execute a search on the basis of a search condition; an item specification unit configured to specify particular data as an item from data included in a result of the search executed by the search execution unit on the basis of the search condition; an item storage unit configured to store the item specified by the item specification unit in a storage apparatus; a search result generation unit configured to generate a search result without data overlap on the basis of data included in a result of a search executed by the search execution unit on the basis of a new search condition and the item stored in the storage apparatus; and a search result display unit configured to display the search result generated by the search result generation unit.

With the above-described configuration, in a case where the search conditions are changed to execute the plurality of searches, it is possible to create and provide the search results in which the overlap of data already obtained in the previous search with the data obtained in the new search is eliminated.

In addition, the present invention may be a search method, a program, and a storage medium.

According to the aspect of the present invention, in a case where the search conditions are changed to execute the plurality of searches, it is possible to create and provide the search results in which the overlap of data already obtained in the previous search with the data obtained in the new search is eliminated.

Further features of the present invention will become apparent from the following description of exemplary embodiments with reference to the attached drawings.

BRIEF DESCRIPTION OF THE DRAWINGS

FIG. 7 shows a user interface example (part 2).

FIG. 8 shows a user interface example (part 3).

FIGS. 14A and 14B show user interface examples (part 6).

DESCRIPTION OF THE EMBODIMENTS

Hereinafter, embodiments of the present invention will be described with reference to the drawings.

Figure 1:
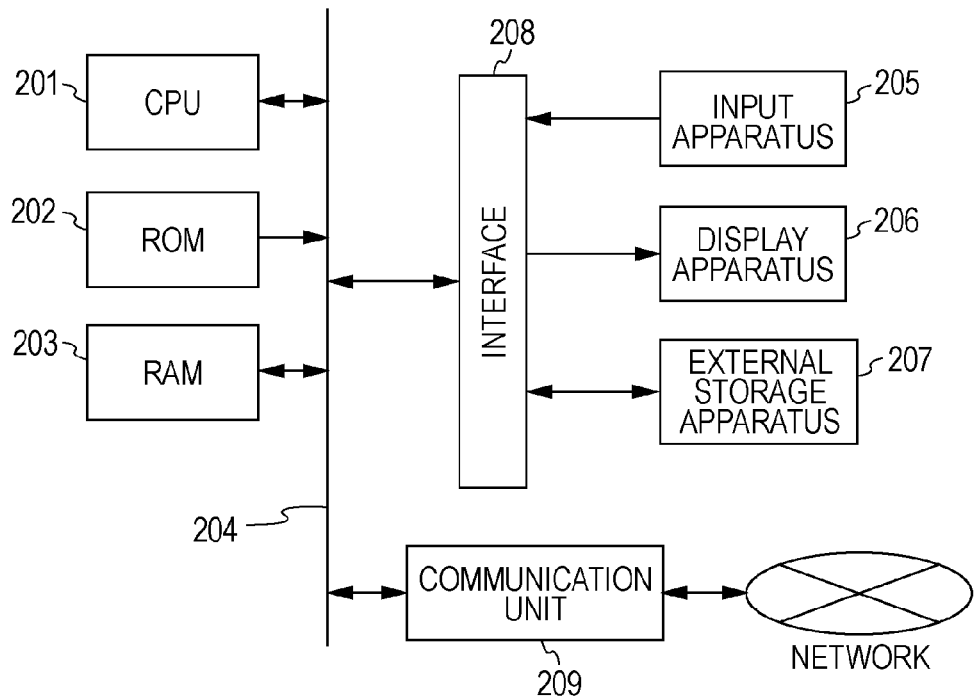
FIG. 1 shows a hardware configuration example of an information processing apparatus (computer).

FIG. 1 shows a hardware configuration example of an information processing apparatus (computer). A CPU 201 executes a processing on the basis of an OS (Operating system) and various programs to control the respective units of the information processing apparatus. A ROM 202 stores static data among the programs executed by the CPU 201 and parameters for computations. A RAM 203 is utilized as a work area for the CPU 201 and a temporary storage area of data. The ROM 202 and the RAM 203 are connected via a bus 204 to the CPU 201. An input apparatus 205 such as a key board OR a touch panel, a display apparatus 206 such as a CRT or a liquid crystal display, and an external storage apparatus 207 such as a hard disk apparatus, an MO, OR a CD-ROM are connected via an interface 208 to the bus 204. Also, the bus 204 is connected via a communication unit 209 to a network.

It is noted that as the CPU 201 executes the processing on the basis of the OS and the various programs, a functional configuration which will described below or a processing according to a flow chart is realized.

Figure 2:
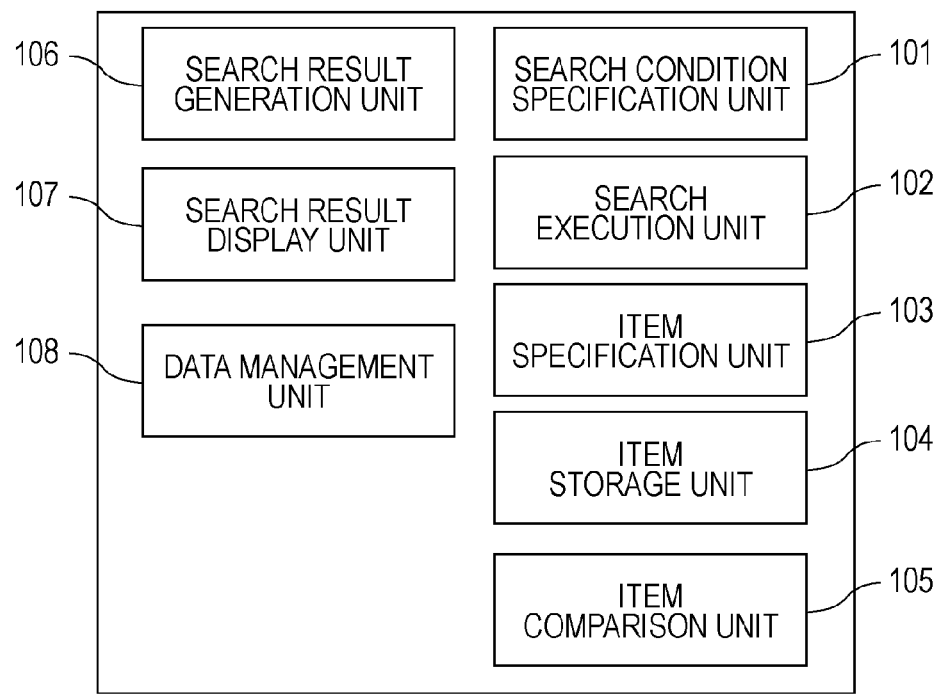
FIG. 2 shows a function configuration example of the information processing apparatus (computer).

FIG. 2 shows a function configuration example of the information processing apparatus (computer).

A search condition specification unit 101 obtains an attribute and an attribute value on the basis of a selection operation by a user (user operation) via a screen shown in FIG. 4 which will described below, and on the basis of the attribute and the attribute value thus obtained, the search condition specification unit 101 specifies a search condition by generating the search condition. A search execution unit 102 performs a data search while following the search condition specified by the search condition specification unit 101. According to the present embodiment, the search execution unit 102 performs an attribute search. An item specification unit 103 specifies particular data as an item from the search results. An item storage unit 104 stores the data specified as the item by the item specification unit 103 in the external storage apparatus 207 or the like. An item comparison unit 105 compares the data set of the search results obtained through the search by the search execution unit 102 with the data stored by the item storage unit 104.

A search result generation unit 106 integrates the search result by the search execution unit 102 with the data stored in the item storage unit 104 on the basis of the comparison result by the item comparison unit 105 to generate a search result without data overlap. A search result display unit 107 performs display of the search result generated by the search result generation unit 106, change in a sort order, and the like. A data management unit 108 inputs, outputs, and saves search target data. It is noted that the search target data is stored by the data management unit 108 in the external storage apparatus 207 OR the like.

Figure 3:
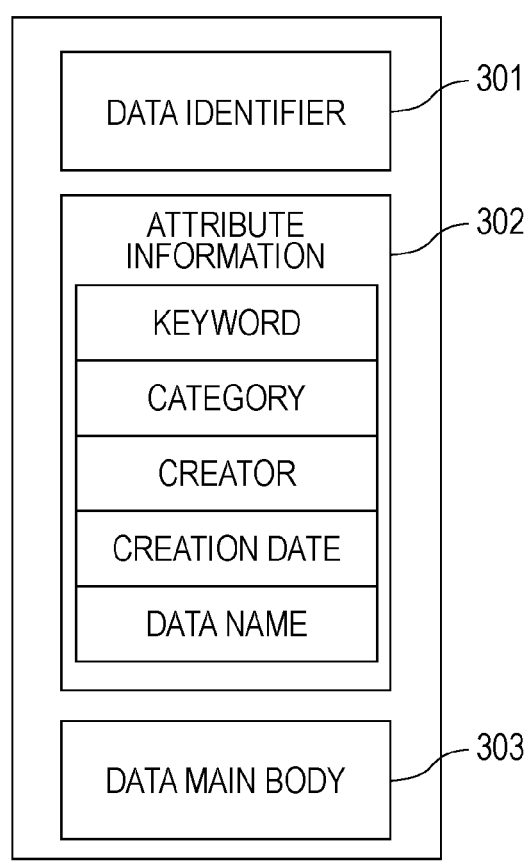
FIG. 3 shows a configuration example of data used according to an embodiment of the present invention.

FIG. 3 shows a data configuration example used according to the present embodiment. It suffices if a data identifier 301 can uniquely identify the data in the data search system (information processing apparatus) according to the present embodiment, and an identifier in an arbitrary format such as a path or UUID can be used. Attribute information 302 uses five attributes including a keyword, a category, a creator, a creation date, and a data name according to the present embodiment. As to the attribute information too, the specific configuration thereof does not regulate the present embodiment. A data main body 303 is data such as a text or an image.

According to the present embodiment, the description has been provided in the setting that the information processing apparatus performs the attribute search the attribute information 302 by using on the basis of the data configuration shown in FIG. 3, but other arbitral search method (a full text search, an image search, etc.) may also be used.

Figure 4:
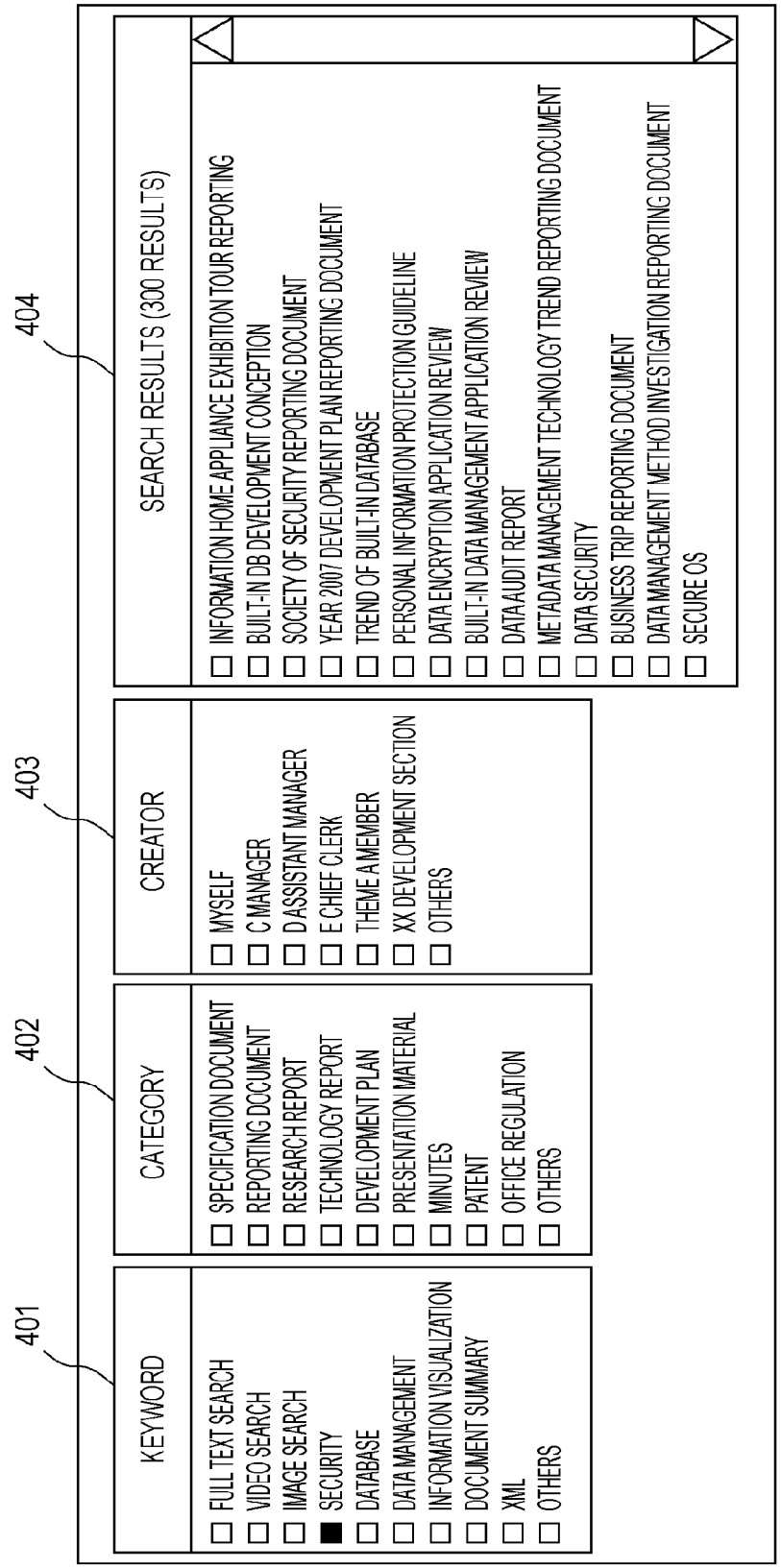
FIG. 4 shows a user interface example (part 1).

FIG. 4 shows a user interface example (part 1). With reference to FIG. 4, a basic search operation and a search processing according to the present embodiment will be described.

Reference numerals 401 to 403 denote attribute selection areas. In the attribute selection areas, attributes defined by the attribute information 302 and attribute values actually set to the data saved in the external storage apparatus 207 are listed up. The information processing apparatus according to the present embodiment displays the three attributes including the keyword, the category, and the creator and the attribute values as one list for each set. It is noted that in a case where the attributes are too may and cannot be displayed on one screen OR the attribute values are too many and cannot be displayed on one screen, the information processing apparatus may also switch the target to be displayed in the attribute selection area or allow the user to select. According to the present embodiment, in order to simplify the description, the description has been provided in the setting in which all the above-described three attributes and the attribute values are displayed.

Figure 5:
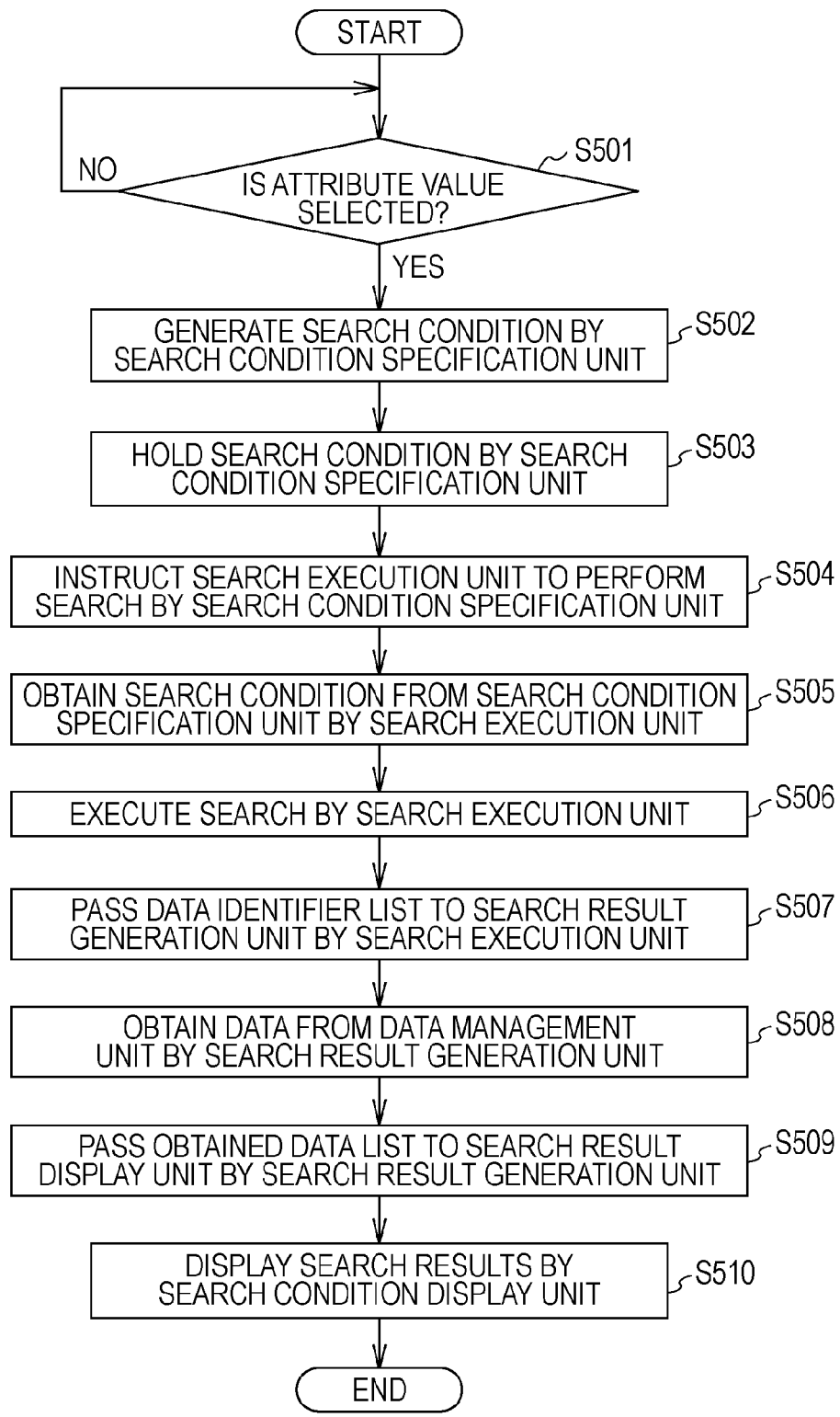
FIG. 5 is a flow chart showing a search processing example (part 1).

FIG. 5 is a flow chart showing a search processing example (part 1).

In step S501, the search condition specification unit 101 determines whether the attribute value is selected by the user. In a case where the search condition specification unit 101 detects the selection, the flow advances to step S502, and in a case where the search condition specification unit 101 does not detect the selection, the processing in step S501 is repeatedly performed. The user performing the search presses, for example, one attribute value from a list shown in FIG. 4 displayed on a touch panel type liquid crystal screen to select one of the attribute values from the attribute value list. The search condition specification unit 101 detects this selection.

In step S502, the search condition specification unit 101 generates a search condition from the selected attribute value and the attribute. FIG. 4 shows a state in which "security" is selected from the list of "keyword". In this case, the search condition specification unit 101 generates the search condition of "keyword=security".

In step S503, the search condition specification unit 101 holds the generated search condition in the RAM 203 or the like.

In step S504, the search condition specification unit 101 instructs the search execution unit 102 to execute the search.

In step S505, the search execution unit 102 obtains the search condition held by the search condition specification unit 101.

Then, in step S506, the search execution unit 102 searches for the search target data stored in the external storage apparatus 207 OR the like on the basis of the obtained search condition.

In step S507, the search execution unit 102 generates a list of the data identifiers 301 for the data hit in the search as the search result. This list generated by the search execution unit 102 will be hereinafter referred to as current list.

When the generation of the current list is finished, in step S507, the search execution unit 102 passes over the current list to the search result generation unit 106.

In step S508, the search result generation unit 106 obtains data indicated by the data identifier in the current list from the data management unit 108 to generate a list of the data. In step S509, the search result generation unit 106 passes over the generated list of the data to the search result display unit 107.

In step S510, the search result display unit 107 generates a full list by obtaining the attribute value from the data obtained from the search result generation unit 106 and displays the full list on a search result display area 404 of FIG. 4.

As described above, according to the present embodiment, each time the user selects the attribute value in the attribute selection area, a search is executed on the basis of a new search condition, and the search result in the search result display area is dynamically updated.

Next, a generation rule for the search condition will be described. In a case where the attribute values are selected from a plurality of attributes, the search condition specification unit 101 sets a logical product of these as the search condition. For example, a case will be exemplified in which in the state shown in FIG. 4 ("security" of the list of "keyword" is already selected), "reporting document" from a list of "category" is further selected. In this case, the search condition specification unit 101 generates "keyword=security AND category=reporting document" as the search condition. Also, in a case where the attribute values are selected from the same attribute, the search condition specification unit 101 sets a logical sum of these as the search condition. For example, in the state shown in FIG. 4, in a case where "encryption" is additionally selected from the list of "keyword", the search condition specification unit 101 generates "keyword=security OR keyword=encryption" as the search condition.

The above is for the description of the basic operation for the search processing.

Next, with reference to FIGS. 6 to 9, a processing will be described in which while an item is selected from the search result, the search is repeatedly executed to obtain plural pieces of data. The processing in which the user selects one attribute value from the attribute selection area to execute the search is the same as described above, and a description thereof will be omitted here, and a description starts from a state in which the search result is obtained.

Figure 6:
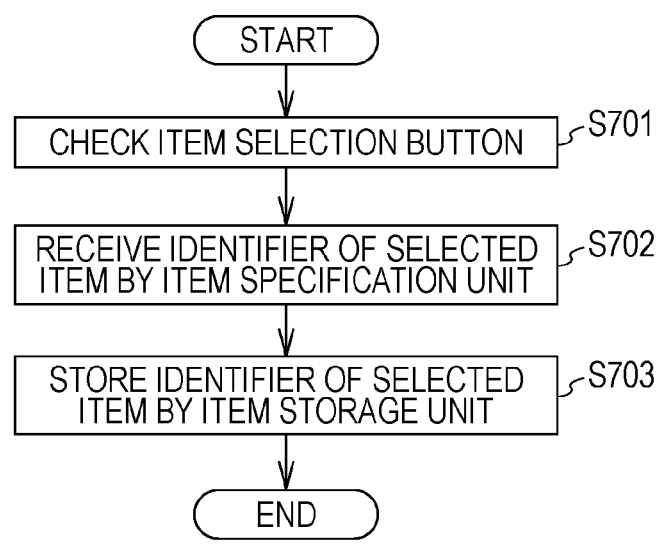
FIG. 6 is a flow chart showing an item selection processing example.

FIG. 6 is a flow chart showing an item selection processing example. In step S701, in a case where a part of the target data is displayed in the search result display area after the first search is finished, the user selects the relevant data. Herein, FIG. 7 shows a user interface example (part 2). FIG. 7 shows an example in which two pieces of data including "society of security reporting document" and "data audit report" are selected as items, and checks are marked in item selection buttons 601.

When the user marks the checks in item selection buttons, in step S702, the item specification unit 103 detects the data identifiers of the selected data.

Subsequently, in step S703, the item storage unit 104 stores the data identifiers detected (specified) by the item specification unit 103 in the external storage apparatus 207 or the like.

After the items are specified, the user continuously performs a search for remaining unfound data. Herein, in order to reduce the number of results by removing noise included the search result, an example will be described in which a search condition is added to perform another search again.

Figure 9:
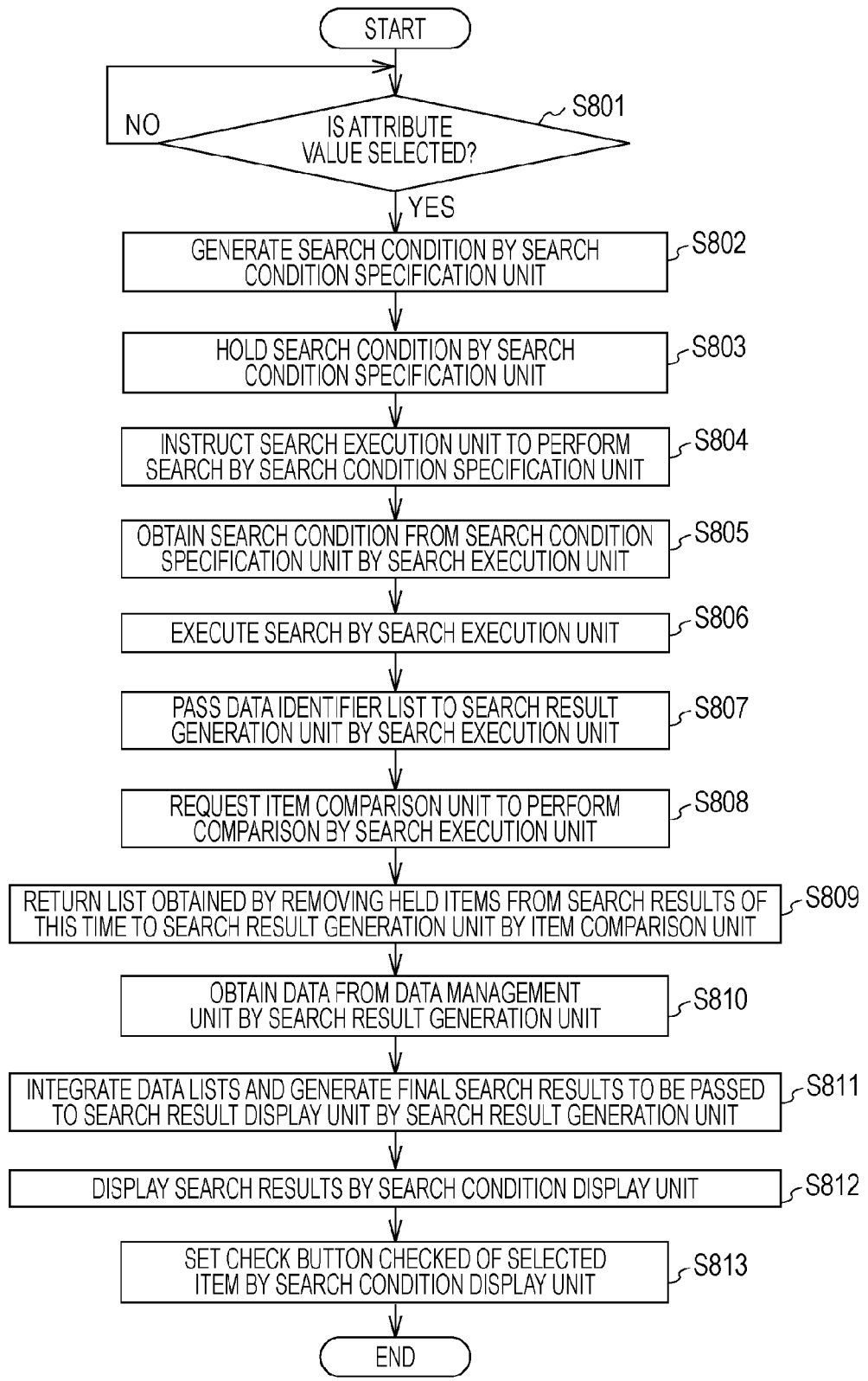
FIG. 9 is a flow chart showing a search processing example (part 2).

FIG. 8 shows a user interface example (part 3). In the example of FIG. 8, from the state of FIG. 7, "reporting document" is selected from "category" as an attribute value other than "keyword". FIG. 9 is a flow chart showing a search processing example (part 2).

In step S801, the search condition specification unit 101 determines whether the attribute value is selected by the user. As in the example of FIG. 8, in a case where "reporting document" is newly selected from "category", the search condition specification unit 101 determines that the attribute value is selected, and the flow advances to step S802.

In step S802, in a case where the attribute value is selected from a different attribute, on the basis of the above-described generation rule for the search condition, the search condition specification unit 101 generates a search condition by using the logical product. That is, while following the search condition generation rule described above, in the case of the different attribute, an AND condition is generated. In the case of the example in FIG. 8, the search condition specification unit 101 generates "keyword=security AND category=reporting document" as the search condition.

Then, in step S803, the search condition specification unit 101 holds the generated search condition.

In step S804, the search condition specification unit 101 instructs the search execution unit 102 to execute the search.

In step S805, the search execution unit 102 obtains the search condition held by the search condition specification unit 101.

Then, in step S806, the search execution unit 102 searches for the search target data stored in the external storage apparatus 207 OR the like on the basis of the obtained search condition.

In step S807, the search execution unit 102 generates the current list and passes over the generated current list to the search result generation unit 106.

In step S808, the search result generation unit 106 obtaining the current list from the search execution unit 102 passes over the current list to the item comparison unit 105. Then, the search result generation unit 106 requests the item comparison unit 105 to compare the item stored by the item storage unit 104 in the external storage apparatus 207 with the current list.

In step S809, the item comparison unit 105 obtains the data identifier of the item stored by the item storage unit 104 in the external storage apparatus 207 and generates a difference list in which the data identifier of the item is removed from the current list passed over from the search result generation unit 106. It is noted that this processing is an example of a processing of generating difference data. Then, the item comparison unit 105 returns the generated difference list to the search result generation unit 106. At this time, the item comparison unit 105 does not consider whether the item obtained from the external storage apparatus 207 is matched with the current search condition. The item comparison unit 105 only simply removes the data identifier matched with the data identifier of the item from the current list.

In step S810, the search result generation unit 106 having the difference list returned from the item comparison unit 105 obtains the data included in the difference list from the data management unit 108 and generates a search result data list. Furthermore, the search result generation unit 106 obtains a list of items from the external storage apparatus 207 and obtains data relevant to the items from the data management unit 108 to generate an item data list.

Subsequently, in step S811, the search result generation unit 106 integrates these two data lists with each other to generate a final search result. According to the present embodiment, the search result generation unit 106 connects the search result data list to the end of the item data list to generate the final search result. Also, in order to distinguish the item data list part from the search result data list part, the search result generation unit 106 sets (adds) a flag (identification information) to each of the final search results indicating whether the result is included in which one of the data lists. Then, the search result generation unit 106 passes over the generated final search result to the search result display unit 107.

In step S812, the search result display unit 107 obtains the attribute values to be displayed in the fill list from the data included in the final search result obtained from the search result generation unit 106 to generate data for the display and displays the data for the display in the search result display area.

It is noted that at this time, the search result display unit 107 set a state in which the item selection button for the data of the item data list part is checked (check state) on the basis of the flag (step S813).

In the example of FIG. 8, "security" and "reporting document" are selected as the attribute values, and the items selected by the user ("society of security reporting document" and "data audit report") are displayed at the highest rank in the check state. In other words, "society of security reporting document" and "data audit report" are displayed so as to be identified as the items. It is noted herein that even if the attribute value "reporting document" of the search condition in which "society of security reporting document" and "data audit report" are added afterward is absent, "society of security reporting document" and "data audit report" are displayed in the search result. With this configuration, when the search is performed again after the search condition is added, it is possible to prevent a situation that the items are slipped out from the search result as the already found data is not matched with the added search condition. In other words, the user can efficiently find plural pieces of data.

After that, while following a similar procedure, the user repeatedly performs the above-described operation by specifying newly found target data as the item and selecting the attribute value from unselected attributes until all the pieces of target data can be found.

The above is for the description of the procedure for the search processing in a state in which the item is selected.

Figure 10:
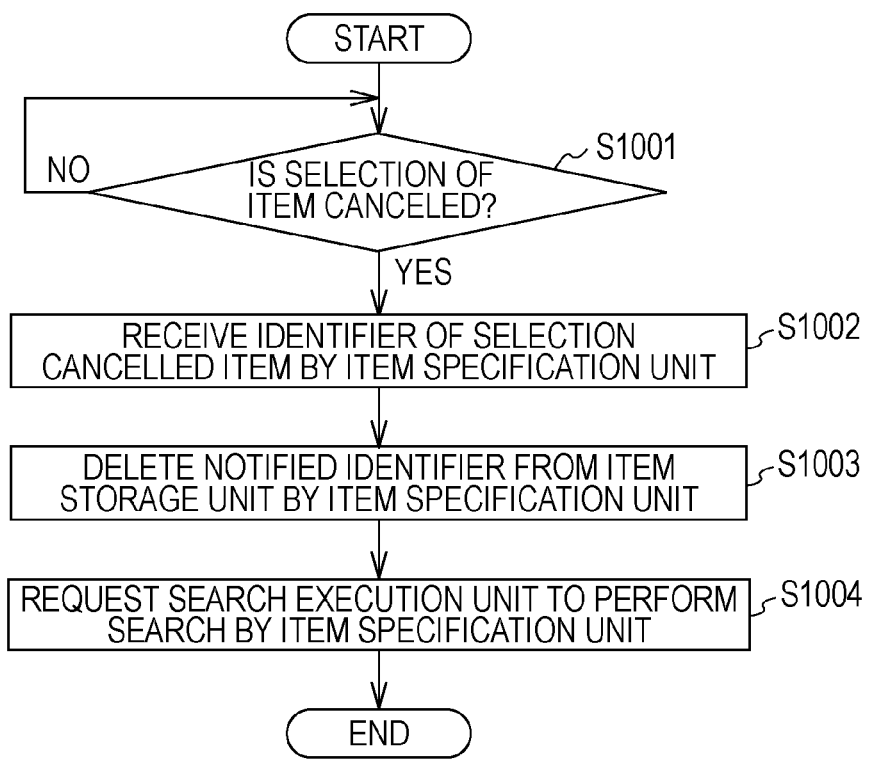
FIG. 10 is a flow chart showing an item selection cancellation processing example.

Next, with reference to FIG. 10, a processing in the case of cancelling the selection of the item from the search result will be described. FIG. 10 is a flow chart showing an item selection cancellation processing example.

First, the user cancels the check of the item in which the check is marked in the item selection button among the search results displayed in the search result display area.

In step S1001, the item specification unit 103 determines whether the check of the item in which the check is marked in the item selection button is canceled. In a case where the item specification unit 103 detects that the user cancels the check of the item in which the check is marked in the item selection button among the search results displayed in the search result display area, it is determined that the selection of the item is cancelled, and the flow advances to step S1002.

In step S1002, the item specification unit 103 obtains the data identifier of the data whose selection is cancelled.

In step S1003, the item specification unit 103 removes (deletes) the item identified by the obtained data identifier via the item storage unit 104 from the external storage apparatus 207.

Subsequently, in step S1004, the item specification unit 103 requests the search execution unit 102 to execute the search.

After that, all the processings from the execution of the search to the search result display correspond to steps S802 to S813, and a description thereof will be omitted here. In another search in S1004, if the item whose check is cancelled is matched with the current search condition, the item is displayed in the search result in a state where the check is removed. On the other hand, if the item whose check is cancelled is not matched with the current search condition, the item is not included in the search result.

The above is for the description according to the first embodiment.

It is noted that according to the present embodiment, the description has been provided in the setting in which the execution of the search is immediately performed when the user selects the attribute value or cancels the selection of the item, but the embodiment of the present invention is not limited to the above. After the attribute value is selected or the selection of the item is cancelled, the information processing apparatus may also execute the search in a case where it is detected that an instruction for the execution of the search is explicitly issued by the user.

The module configuration of the data search system according to the present embodiment corresponds to the first embodiment, and therefore a description thereof will be omitted.

Figure 11:
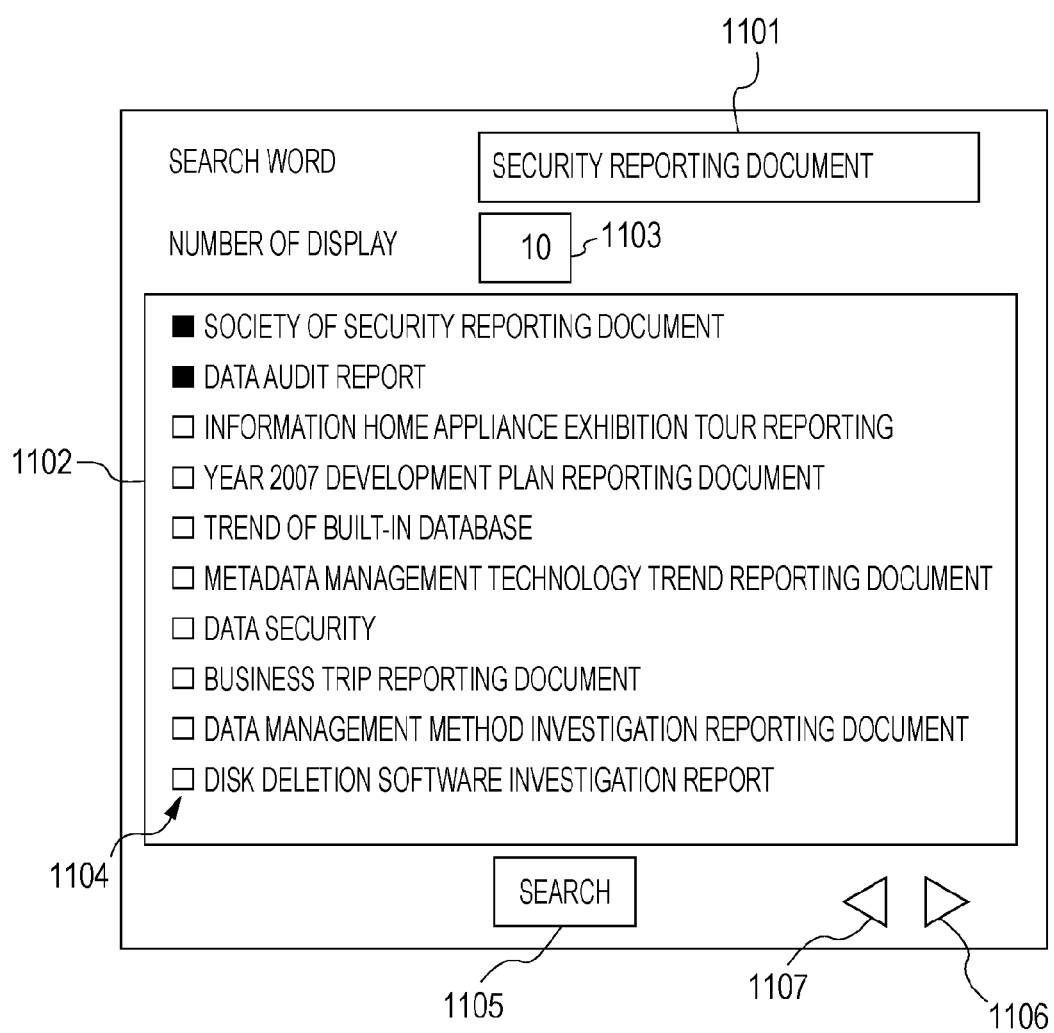
FIG. 11 shows a user interface example (part 4).

FIG. 11 shows a user interface example (part 4). As shown in FIG. 11, a user interface according to the present embodiment has a configuration similar to a user interface of a general Web search system. Reference numeral 1101 denotes a search word specification area. According to the present embodiment, for a specification method for the search condition, a search word is used. Reference numeral 1102 denotes a search result display area where search results are displayed for each number of results specified by a result number specification area 1103. Reference numeral 1104 denotes an item selection button. Reference numeral 1105 denotes a search execution button. Reference numerals 1106 and 1107 respectively denote a page feed button and a page return button for changing a range of data displayed in the search result display area.

Next, a procedure for a search processing according to the present embodiment will be described.

When the user inputs a search word in the search word specification area 1101 and presses the search execution button 1105, first, the search condition specification unit 101 obtains the search word input in the search word specification area 1101 and holds this. Subsequently, the search execution is instructed from the search condition specification unit 101 to the search execution unit 102. After that, processings from the execution of the search to the pass over of the final search result to the search result display unit 107 correspond to steps S802 to S811 according to the first embodiment, and a description thereof will be omitted here. The search result display unit 107 receiving the final search result obtains the attribute value to be displayed in the full list from the data included in the final search result to generate data for the display. Next, the search result display unit 107 obtains the number of display results from the result number specification area 1103 and displays the data for the display from the front line by the number of display results in the search result display area 1102. At that time, the search result display unit 107 displays the data selected as the item in a state in which the item selection button is checked. This is similar to the first embodiment. Also, the data selected as the item is displayed in the search result irrespective of whether the data is matched with the current search condition or not, which is also similar to the first embodiment.

Next, a page shift processing for the search result display area 1102 will be described. According to the present embodiment, not only another search is performed by changing the search condition, but also when the page shift is performed, the information processing apparatus keeps displaying the data selected as the item in the search result.

Figure 12:
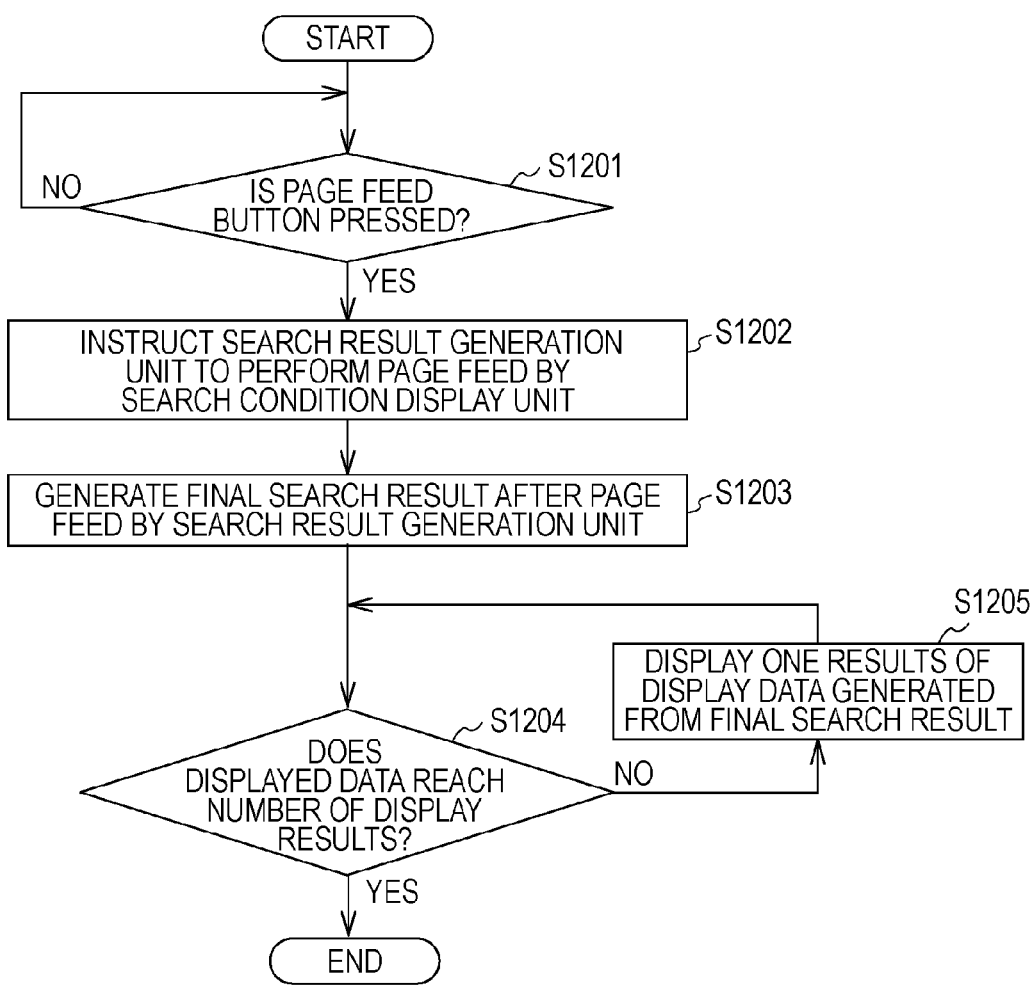
FIG. 12 is a flow chart showing a processing example related to page feed.

First, a page feed processing will be described with reference to FIG. 12. FIG. 12 is a flow chart showing a processing example related to the page feed.

In step S1201, the search result display unit 107 determines whether the user presses the page feed button 1106. In a case where the user presses the page feed button 1106, the search result display unit 107 specifies the data identifier the last data currently displayed to instruct the search result generation unit 106 to perform the page feed in step S1202.

In step S1203, the search result generation unit 106 generates a new final search result by connecting the search result data list of the subsequent data after the data instructed from the search result display unit 107 to the end of the item data list and passes over this to the search result display unit 107.

Finally, in steps S1204 and S1205, the search result display unit 107 displays the final search result obtained from the search result generation unit 106 by the number of display results specified by the result number specification area 1103 in the search result display area 1102. The display processing of the search result display unit 107 is the same as described above, and a description thereof will be omitted here.

Next, a page return processing will be described. When the user presses the page return button 1107 in a state in which the search result is displayed, the search result display unit 107 specifies the identifier of the data in the front line of the currently displayed search result data list part and the number of display results and instructs the search result generation unit 106 to perform the page return. The search result generation unit 106 generates the final search result by connecting the search result data list of the subsequent data in the front side by the number of (the number of display results—the size of the item data list) from the data instructed by the search result display unit 107 to the end of the item data list. Then, the search result generation unit 106 passes over the generated final search result to the search result display unit 107. The subsequent processing after this corresponds to the page feed, and a description thereof will be omitted here.

The above is for the description according to the second embodiment.

In the above-described embodiment, the description has been provided in the setting in which the information processing apparatus displays the data selected as the item in a state in which the item selection button is checked when being displayed in the search result irrespective of whether the data is matched with the search condition for the search performed again. According to the present embodiment, the information processing apparatus displays the data in the search result while the matching state with the search condition for the search performed again is also indicated. This is realized through the following method, for example. The information processing apparatus displays the data with the block check immediately after being selected as the item. On the other hand, in the search result display screen after the search performed again, the information processing apparatus displays the item matched with the search condition for the search performed again with a check of a circle mark and the item not matched with the search condition for the search performed again with a check of a cross mark.

Figure 13:
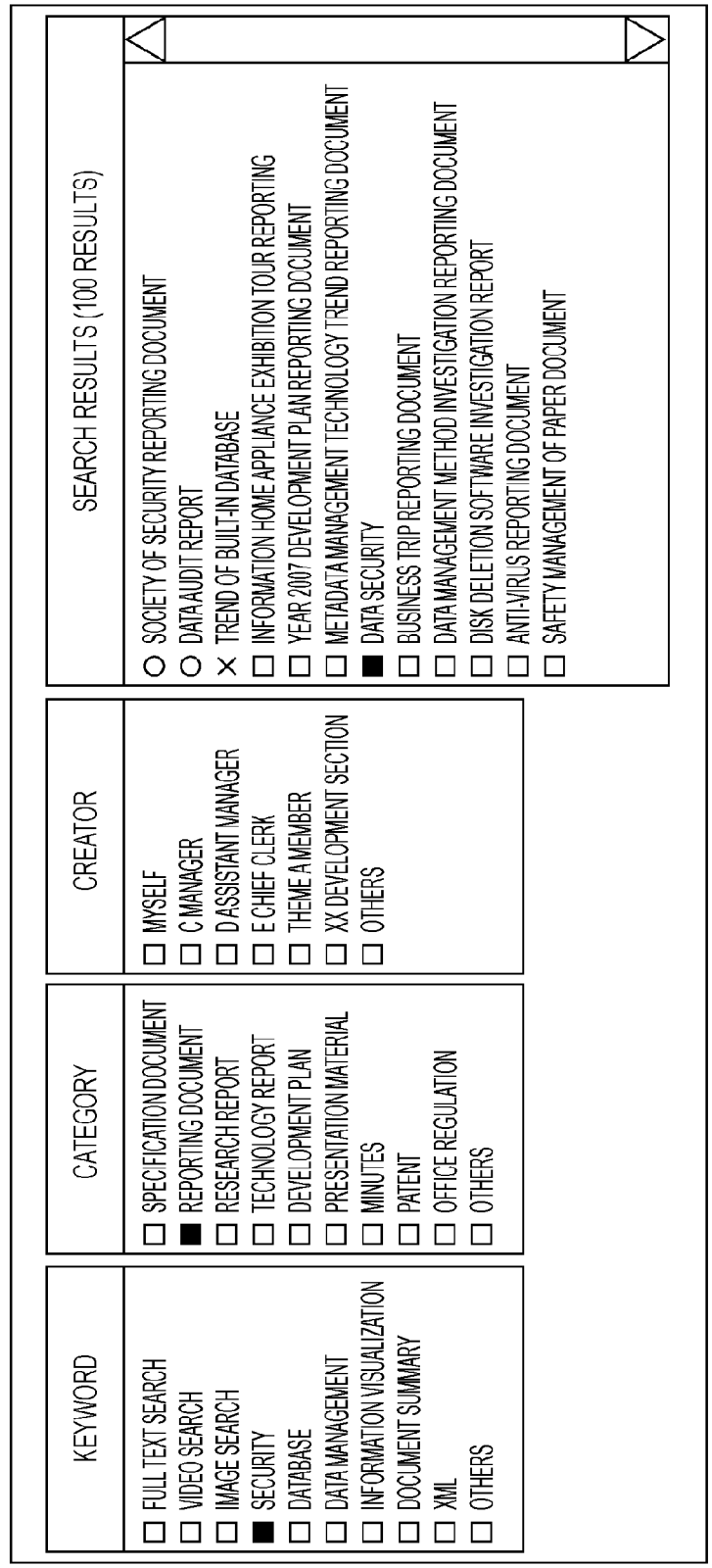
FIG. 13 shows a user interface example (part 5).

According to the present embodiment, the item comparison unit 105 determines whether the data selected as the item is matched with the search condition for the search performed again and saves the determination result in the match state data. When the data identifier stored in the external storage apparatus 207 is removed from the current list, the item comparison unit 105 generates match state data for the item corresponding to the actually removed data identifier in which the match state is 1 (match identification information is 1). On the other hand, the item comparison unit 105 generates the match state data to the item not corresponding to the removed data identifier in which the match state is 0 (the match identification information is 0). Then, the item comparison unit 105 returns the list of the match state data to the search result generation unit 106. The search result display unit 107 collates the list of items obtained from the external storage apparatus 207 with the list of the match state data and switches the state of the item selection button in accordance with the value of the match state data (the value of the match identification information) for the display. FIG. 13 shows a user interface example (part 5). In the example of FIG. 13, "society of security reporting document" and "data audit report" are items matching with both "keyword=security" and "category=reporting document". On the other hand, "trend of built-in database" is an item which is matched with "keyword=security" but is not matched with "category=reporting document". Also, "data security" indicates the data newly specified in this time as the item.

The above is for the description according to the third embodiment.

According to the above-described embodiment, the description has been given in which the information processing apparatus displays the data selected as the item at a higher rank than the search result. However, according to the present embodiment, the information processing apparatus may also merge the data selected as the item with the data which is not selected as the item to be displayed. FIGS. 14A and 14B shows a user interface example (part 6). FIG. 14A shows an example of a case in which the search result display unit 107 sorts and displays the search results in the column of the item selection button, which is the same as the above-described embodiment. FIG. 14B shows an example of a case in which the search result display unit 107 sorts the same search results as those of FIG. 14A in the column of the creator.

The search result display unit 107 may display the search results via the user interface to the user as shown in FIG. 14A in a case where the item selection button is selected, and the search result display unit 107 may display the search results as shown in FIG. 14B in a case where the creator is selected.

According to the above-described embodiment, with regard to the information processing apparatus, the description has been provided in the setting in which the processing of removing the overlap of the data selected as the item and the search results obtained through the search based on the new search condition is performed by the item comparison unit 105 after the search execution. However, the information processing apparatus may also, for example, specify a new search condition which excludes the data selected as the item and execute the search.

The information processing apparatus may also even display the item whose selection is cancelled to be included in the search result if the item is matched with the search condition, and in the case of the item whose selection is explicitly cancelled by the user, even if the item is matched with the search condition, the item may not be included in the search result.

Also, the aspects of the present invention can be achieved through the following configuration. That is, a storage medium (or recording medium) on which a software program code for realizing the above-described embodiments is recorded is supplied to a system or an apparatus. Then, the program code stored on the storage medium is read out and executed by a central processing unit (CPU or MPU) of the system or the apparatus. In this case, the program code itself read out from the storage medium realizes the functions of the above-described embodiments, and the storage medium on which the program code is recorded constitutes the present invention.

In addition, as the program code read out by the central processing unit of the system or the apparatus is executed, an operating system (OS) or the like running on the system or the apparatus performs a part or all of the actual processes on the basis of an instruction of the program code. The present invention also includes a case in which the functions of the above-described embodiments are realized through the processing.

Furthermore, the program code read out from the storage medium is supposed to be written in a memory that is provided to a function expansion board inserted in the system or the apparatus or a function expansion unit connected to the system or the apparatus. After that, on the basis of the instruction of the program code, a CPU or the like provided to the function expansion board or the function expansion unit performs a part or all of the actual processes. The present invention also includes a case in which the functions of the above-described respective embodiments are realized through the processing.

In a case where the present invention is applied to a storage medium, the storage medium (computer-readable storage medium) stores a program code corresponding to the flow charts described above.

As described above, according to the above-described respective embodiments, when the plural pieces of data are searched for while the search conditions are changed, it is possible to present the search results including the already found data and the data obtained on the basis of the new search condition without the overlap to the user. Also, according to the above-described respective embodiments, in addition to the above-described effects, it is possible to present the already found data and the data obtained on the basis of the new search condition to the user while being distinguished from each other. For that reason, the user can easily compare the already found data with the data obtained on the basis of the new search condition, and it is possible efficiently perform the operation of obtaining the when the plural pieces of data are searched for while repeatedly carrying out the search. Furthermore, according to the above-described respective embodiments, by displaying the search results in which the already found data and the data obtained on the basis of the new search condition are integrated with each other, the list visibility of the results is improved.

In other words, according to the above-described respective embodiments, in a case where the search conditions are changed to execute the plurality of searches, it is possible to create and provide the search results in which the overlap of data already obtained in the previous search with the data obtained in the new search is eliminated.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-229968 filed Sep. 8, 2008, which is hereby incorporated by reference herein in its entirety.

What is claimed is:

1. An information processing apparatus comprising:
an execution unit configured to execute a search of target data based on a first search condition to produce a first search result and then execute a search of the target data based on a second search condition, as a new search condition, to produce a second search result;
a specification unit configured to specify at least one data included in the first search result;
a storage unit configured to store, in a storage medium, data specified by the specification unit;
a generation unit configured to generate an integrated result to display based on the specified data stored in the storage medium and the second search result, wherein, even though the specified data does not match the second search condition and is not included in the second search result, the generation unit puts the specified data in the integrated result, wherein, except for the specified data, the generation unit does not put, in the integrated result, the first search result which does not match the second search condition; and
a display unit configured to display the integrated result generated by the generation unit,
wherein, based on a number of pieces of the specified data, a ratio of an area to display a part of the second search result in a display area whose size is limited changes, thereby the display unit preferentially displays the specified data, and displays part of the second search result,
wherein, in a case where specifying of at least one piece of specified data is canceled while the display unit is displaying the integrated result, the generation unit is configured to dynamically regenerate the integrated result based on remaining pieces of specified data and the second search result and the display unit is configured to display the regenerated integrated result, and
wherein at least one of the execution unit, the specification unit, the storage unit, the generation unit, and the display unit are implemented by a central processing unit in the information processing apparatus.

2. The information processing apparatus according to claim 1, wherein the generation unit compares the second search result with the at least one data and, in response to determining that the second search result includes data that matches the at least one data, the generation unit generates difference data by removing, from the second search result, as data overlap, the data that matches the at least one data, and then integrates the generated difference data with data stored in the storage medium to generate the integrated result without the data overlap.

3. The information processing apparatus according to claim 2,
wherein, after integrating the generated difference data with data stored in the storage medium, the generation unit puts source identification information in integrated data to generate the integrated result, wherein the source identification information indicates whether an integrated data in the integrated result was included in the second search result or is data stored in the storage medium, and
wherein the display unit utilizes the source identification information to display the integrated result in a way that makes it possible for a user to identify whether a displayed result in the integrated result is data included in the second search result or is data stored in the storage medium.

4. An information processing apparatus comprising:
an execution unit configured to execute a search of target data based on a first search condition to produce a first search result and then execute a search of the target data based on a second search condition, as a new search condition, to produce a second search result;
a specification unit configured to specify at least one data included in the first search result;
a storage unit configured to store, in a storage medium, data specified by the specification unit;
a generation unit configured to generate an integrated result to display based on the specified data stored in the storage medium and the second search result, wherein, even though the specified data does not match the second search condition and is not included in the second search result, the generation unit puts the specified data in the integrated result, wherein, except for the specified data, the generation unit does not put, in the integrated result, the first search result which does not match the second search condition; and a display unit configured to display the integrated result generated by the generation unit, wherein, based on a number of pieces of the specified data, a ratio of an area to display a part of the second search result in a display area, whose size is limited, changes, thereby the display unit preferentially displays the specified data, and displays part of the second search result, wherein, in a case where specifying of at least one piece of specified data is canceled while the display unit is displaying the integrated result, the generation unit is configured to dynamically regenerate the integrated result based on remaining pieces of specified data and the second search result and the display unit is configured to display the regenerated integrated result, wherein at least one of the execution unit, the specification unit, the storage unit, the generation unit, and the display unit are implemented by a central processing unit in the information processing apparatus, and wherein the display unit displays the integrated result so that the specified data stored in the storage medium is displayed at a rank that is higher than a rank of part of the second search result.

5. The information processing apparatus according to claim 2, wherein the generation unit further associates match identification information to stored data that relates to data that matched data that was removed from the second search result as data overlap, wherein the match identification information indicates that data relates to data that matches the second search condition, and wherein the display unit utilizes the source identification information and the match identification information to display the integrated result in a way that makes it possible for a user to identify whether a displayed result represents (i) data which was included in the second search result but is not relevant to data stored in the storage medium, (ii) data which was included in the second search result and is relevant to data stored in the storage medium, or (iii) data which was not included in the second search result but is relevant to data stored in the storage medium.

6. The information processing apparatus according to claim 1, wherein the specification unit specifies, as data, the at least one data based on a user operation received via a screen that includes data included the first search result.

7. The information processing apparatus according to claim 1, wherein a number of pieces of data in the integrated result is different from a number of pieces of data in the first search result.

8. The information processing apparatus according to claim 1, wherein the display unit is configured to increase a number of pieces of data in the second search result to be displayed as the integrated result by a number of pieces of data that do not match the second search condition and are not displayed as the integrated result among the data of which specifying is canceled.

9. A search method for an information processing apparatus, the search method comprising:

executing a search of target data based on a first search condition to produce a first search result and then execute a search of the target data based on a second search condition, as a new search condition, to produce a second search result;

specifying at least one data included in the first search result;

storing, in a storage medium, specified data;

generating an integrated result to display based on the specified data stored in the storage medium and the second search result, wherein, even though the specified data does not match the second search condition and is not included in the second search result, generating includes putting the specified data in the integrated result, wherein, except for the specified data, generating includes not putting, in the integrated result, the first search result which does not match the second search condition; and displaying the generated integrated result, wherein, based on a number of pieces of the specified data, a ratio of an area to display a part of the second search result in a display area whose size is limited changes, thereby displaying includes preferentially displaying the specified data, and displays part of the second search result, and wherein, in a case where specifying of at least one piece of specified data is canceled while the integrated result is displayed, generating includes dynamically regenerating the integrated result based on remaining pieces of specified data and the second search result and displaying includes displaying the regenerated integrated result.

10. The search method according to claim 9, wherein generating includes comparing the second search result with the at least one data and, in response to determining that the second search result includes data that matches the at least one data, generating includes generating difference data by removing, from the second search result, as data overlap, the data that matches the at least one data, and then integrates the generated difference data with data stored in the storage medium to generate the integrated result without the data overlap.

11. The search method according to claim 10, wherein, after integrating the generated difference data with data stored in the storage medium, generating includes putting source identification information in integrated data to generate the integrated result, wherein the source identification information indicates whether an integrated data in the integrated result was included in the second search result or is data stored in the storage medium, and wherein displaying includes utilizing the source identification information to display the integrated result in a way that makes it possible for a user to identify whether a displayed result in the integrated result is data included in the second search result or is data stored in the storage medium.

12. A search method for an information processing apparatus, the search method comprising:

executing a search of target data based on a first search condition to produce a first search result and then execute a search of the target data based on a second search condition, as a new search condition, to produce a second search result;

specifying at least one data included in the first search result;

storing, in a storage medium, specified data;

generating an integrated result to display based on the specified data stored in the storage medium and the second search result, wherein, even though the specified data does not match the second search condition and is not included in the second search result, generating includes putting the specified data in the integrated result, wherein, except for the specified data, generating includes not putting, in the integrated result, the first search result which does not match the second search condition; and displaying the generated integrated result, wherein, based on a number of pieces of the specified data, a ratio of an area to display a part of the second search result in a display area, whose size is limited, changes, thereby displaying includes preferentially displaying the specified data, and displays part of the second search result, wherein, in a case where specifying of at least one piece of specified data is canceled while the integrated result is displayed, generating includes dynamically regenerating the integrated result based on remaining pieces of specified data and the second search result and displaying includes displaying the regenerated integrated result, and wherein displaying includes displaying the integrated result so that the specified data stored in the storage medium is displayed at a rank that is higher than a rank of part of the second search result.

13. The search method according to claim 10, wherein generating the integrated result further includes associating match identification information to stored data that relates to data that matched data that was removed from the second search result as data overlap, wherein the match identification information indicates that data relates to data that matches the second search condition, and wherein displaying includes utilizing the source identification information and the match identification information to display the integrated result in a way that makes it possible for a user to identify whether a displayed result represents (i) data which was included in the second search result but is not relevant to data stored in the storage medium, (ii) data which was included in the second search result and is relevant to data stored in the storage medium, or (iii) data which was not included in the second search result but is relevant to data stored in the storage medium.

14. The search method according to claim 9, wherein specifying includes specifying, as data, the at least one data based on a user operation received via a screen that includes data included the first search result.

15. The search method according to claim 9, wherein a number of pieces of data in the integrated result is different from a number of pieces of data in the first search result.

16. A non-transitory computer-readable storage medium storing a program to cause a computer to perform a search method for an information processing apparatus, the search method comprising:

executing a search of target data based on a first search condition to produce a first search result and then execute a search of the target data based on a second search condition, as a new search condition, to produce a second search result;

specifying at least one data included in the first search result;

storing, in a storage medium, specified data;

generating an integrated result to display based on the specified data stored in the storage medium and the second search result, wherein, even though the specified data does not match the second search condition and is not included in the second search result, generating includes putting the specified data in the integrated result, wherein, except for the specified data, generating includes not putting, in the integrated result, the first search result which does not match the second search condition; and displaying the generated integrated result, wherein, based on a number of pieces of the specified data, a ratio of an area to display a part of the second search result in a display area whose size is limited changes, thereby displaying includes preferentially displaying the specified data, and displays part of the second search result, and wherein, in a case where specifying of at least one piece of specified data is canceled while the integrated result is displayed, generating includes dynamically regenerating the integrated result based on remaining pieces of specified data and the second search result and displaying includes displaying the regenerated integrated result.

17. The non-transitory computer-readable storage medium according to claim 16, wherein a number of pieces of data in the integrated result is different from a number of pieces of data in the first search result.

* * * * *